United States Patent [19]

Ito

[11] Patent Number: 4,564,307

[45] Date of Patent: Jan. 14, 1986

[54] BALL JOINT

[75] Inventor: Eiichi Ito, Meerbusch, Fed. Rep. of Germany

[73] Assignee: TRW Ehrenreich GmbH & Co. K.G., Dusseldorf, Fed. Rep. of Germany

[21] Appl. No.: 666,244

[22] Filed: Oct. 29, 1984

[30] Foreign Application Priority Data

Nov. 15, 1983 [DE] Fed. Rep. of Germany ....... 3341255

[51] Int. Cl.⁴ .............................................. F16C 11/06
[52] U.S. Cl. ..................................... 403/140; 403/133
[58] Field of Search ........................ 403/135, 140, 133

[56] References Cited

U.S. PATENT DOCUMENTS 3,539,234  11/1970  Rapata ................................ 308/238
3,650,552   3/1972  Schmid ............................... 403/140
4,105,261   8/1978  Myers et al. ......................... 308/72

FOREIGN PATENT DOCUMENTS 1953116  5/1971  Fed. Rep. of Germany .
2034667  5/1972  Fed. Rep. of Germany .
2157355  5/1973  Fed. Rep. of Germany .
2238859  2/1975  France .

Primary Examiner—Andrew V. Kundrat
Attorney, Agent, or Firm—Yount & Tarolli

[57] ABSTRACT

The subject of the invention is a ball joint including a stud having a ball head located in a bearing shell made of elastic material. The bearing shell, which exerts a radial pressure on the ball head, is mounted in a joint housing having substantially a pot shape. The bearing shell is provided on its outer surface with elastically deformable elevations, lying against the inner wall of the joint housing. The elevations are arranged on the shell surface of the bearing shell and are formed as ribs and bars extending in the axial direction and arranged alternatively on the shell surface circumference. The bars are separated from the ribs by grooves. The bar width, measured in the circumferential direction, is greater than the width of the ribs. The radial extent of the ribs is greater than that of the bars. The bars thus bear against the joint housing only in the case of large loads acting on the joint.

7 Claims, 17 Drawing Figures

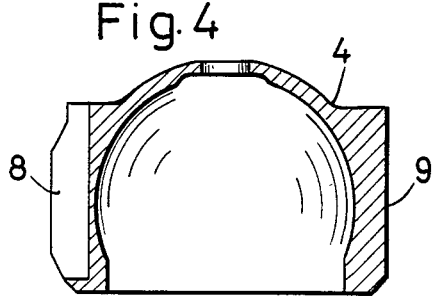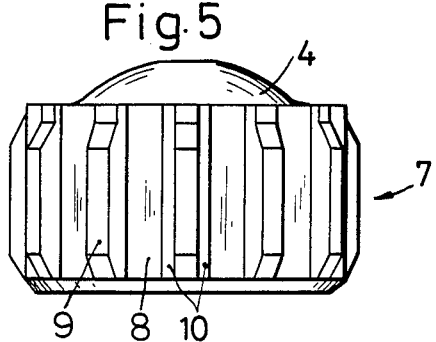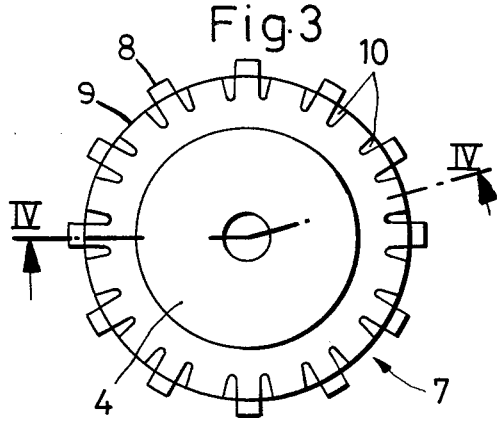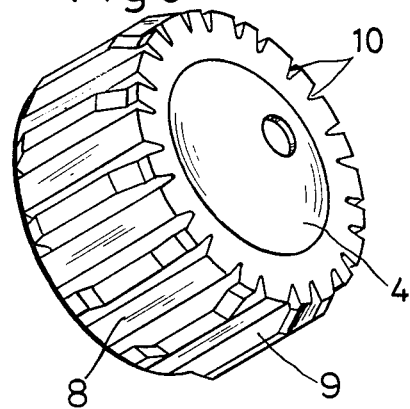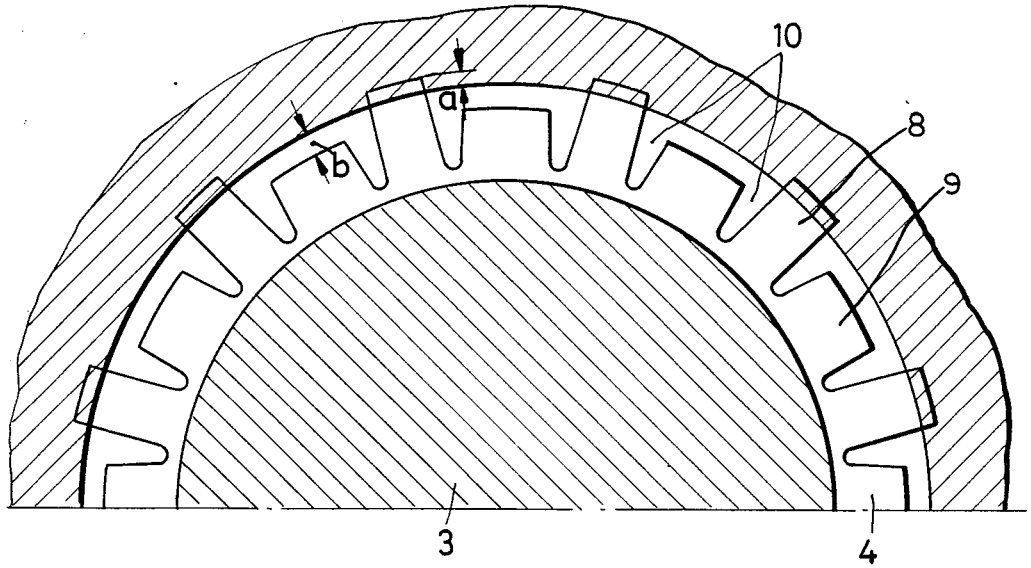

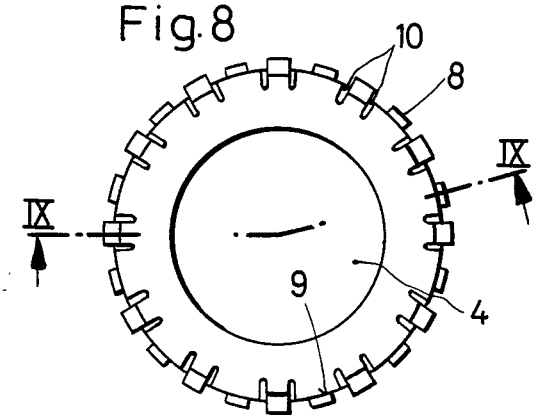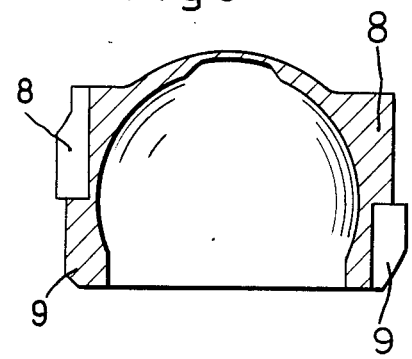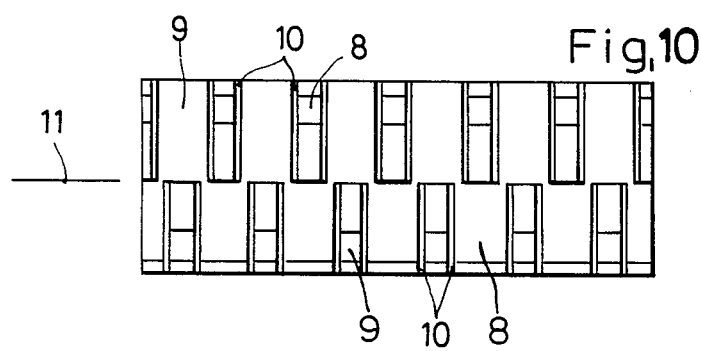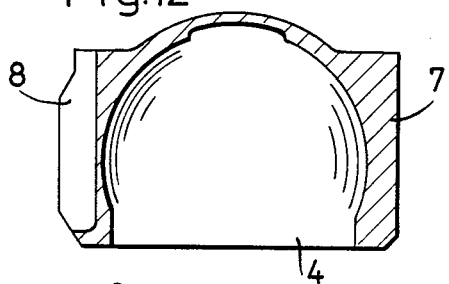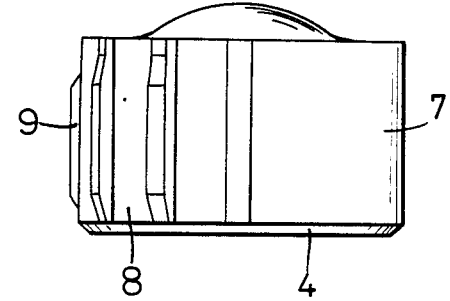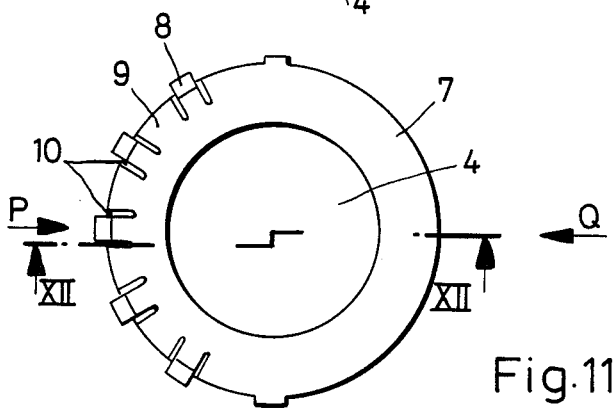

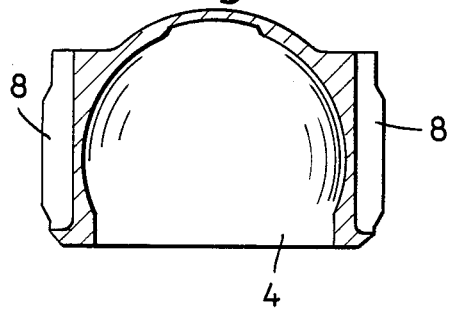
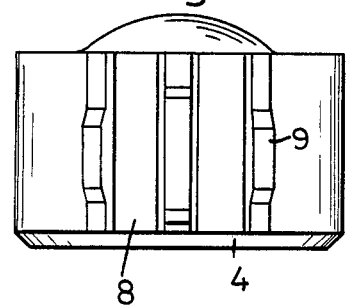
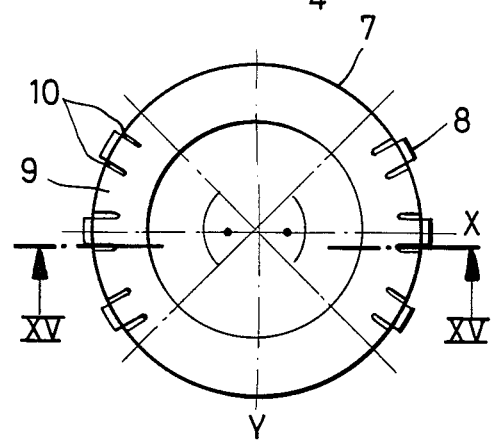
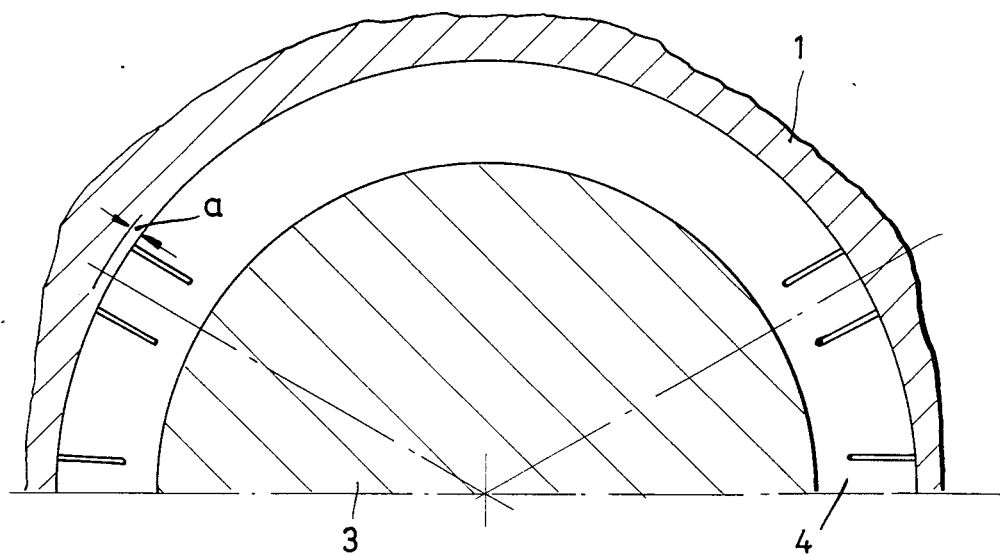

BALL JOINT

The invention relates to a ball joint having a ball head received in a bearing shell made of elastic material. The bearing shell exerts a radial pressure on the ball head and is located in the joint housing. The housing has a substantially pot or cup-shaped design. The bearing shell is provided on its outer surface with elastically deformable elevations lying against the inner wall of the joint housing.

From German Pat. No. 1,953,116, a ball joint with a one-piece bearing shell is known. The bearng shell has, on its end surface, tiny knob-like or cam-like elevations separated from each other. The height of the elevation slightly exceeds the manufacturing tolerances of the joint. The elevations are deformable under the clamping pressure applied to the end surface when they abut a shoulder surface of the joint housing. These known elevations are for the purpose of compensating for production tolerances of the joint parts. This prevents uneven running of the ball joint.

From German Disclosure No. 2,034,667 there is known an elastic ball joint having a bearing shell comprising two halves. One bearing shell half is provided with grooves in order to allow a change in the elasticity. These known grooves are for the purpose of compensating for, when negotiating curves, the side forces on the wheel which are less on the inside of the curve than on the outside of the curve when the ball joint is used in a track rod joint.

The object of the invention is to design the elevations and/or grooves now used for the compensation of production tolerances and for changing the elasticity so that they can provide for absorbing shock loads occurring in driving.

The invention achieves this object by providing on the outer circumferential surface of the bearing shell elevations in the form of ribs and bars extending in the axial direction, arranged alternately with each other, and separated by grooves also extending axially. The circumferential width of the bars is greater than that of the ribs while the radial extent of the ribs is greater than that of the bars. This results in having the bars bear against the joint housing only in the case of large loads acting on the joint.

In a ball joint designed according to the invention longer ribs with a smaller base surface may be used, in the known manner, to compensate for production tolerances of the joint housing when assembling the joint. The shorter bars with a greater base surface should only be considered in the case of shock loads which would deform the longer ribs elastically and thus would eliminate the resilient effect of the bearing shell made from an elastomer if only the longer ribs are present.

The object of the invention consists, therefore, in using ribs and bars having different base surfaces and arranged alternately, the higher lying ribs with the small base surface being used mainly for compensation of production tolerances, and the somewhat lower lying bars with the greater base surface being used to absorb shock loads when driving. This permits the resilient property of the bearing shell to be retained. The empty spaces formed by the grooves between ribs and bars provide for flow of the material in the elastically deformable range.

In practical embodiments, the ribs, bars and grooves may be distributed over the surface of the bearing shell, or they may be arranged only on a half, or only on two opposite sections of the surface of the bearing shell. Uniform distribution of the ribs, bars and grooves over the whole surface of the bearing shell provides for the ball joint having the same resilient properties in all radial directions.

If the ribs, bars and grooves are arranged on only one half of the surface of the bearing shell, then such a ball joint can be used in a track rod, to compensate for the different side forces when negotiating a curve, and to improve the steering of the vehicle.

If the ribs, bars and grooves are arranged only on two opposite sections of the surface of the bearing shell, such a ball joint can be used as a wheel joint, in which it is desired that the tilting moment of the ball stud be greater on one axis than on the axis running at a right angle thereto.

Other details and advantages of the invention would become apparent from the following description with reference to respective drawings, wherein preferred embodiments of a ball joint designed according to the invention are shown schematically.

FIG. 3 shows a top view of a bearing shell with elevations evenly distributed over the whole surface;

FIG. 4 shows a cross section of the same bearing shell along line IV—IV in FIG. 3;

FIG. 5 shows a side view of the same bearing shell;

FIG. 6 shows a perspective view of the same bearing shell;

FIG. 7 shows a horizontal cross-section on an enlarged scale of the overlapping between joint housing and larger elevations on the bearing shell;

FIG. 8 shows a top view of a bearing shell with elevations displaced with respect to each other above and below the equatorial plane;

FIG. 9 shows a cross-section of the same bearing shell along the line IX—IX in FIG. 8;

FIG. 10 shows a side enlarged view of the surface of the same bearing shell;

FIG. 11 shows a top view of the bearing shell with elevations arranged on only one half of the surface;

FIG. 12 shows a cross-section of the same bearing shell along the line XII—XII in FIG. 11;

FIG. 13 shows a side view of the same bearing shell;

FIG. 14 shows a top view of a bearing shell with elevations arranged on opposite sides of the shell surface;

FIG. 15 shows a cross-section of the same bearing shell along the line XV—XV in FIG. 14;

FIG. 16 shows a side view of the same bearing shell;

FIG. 17 shows a horizontal cross-section on a larger scale of the deformed elevations in the assembled condition.

Figure 1:
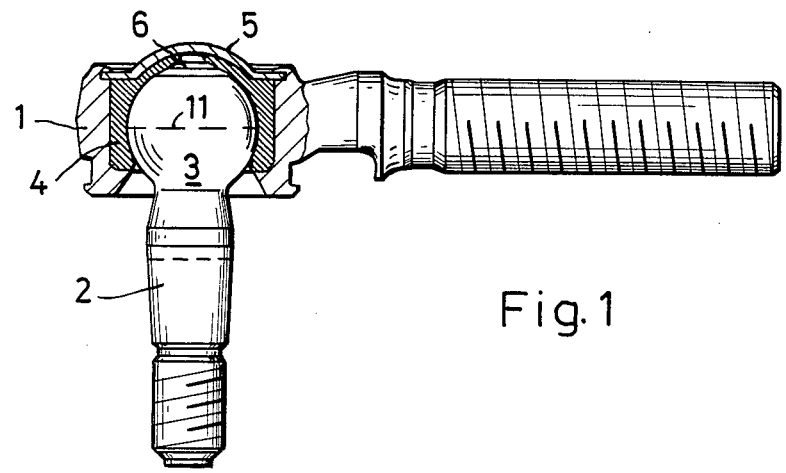
FIG. 1 shows a longitudinal cross-section of a ball joint.

The ball joint of the present invention comprises a housing 1 and a ball stud 2. The ball stud has a ball head 3 located in a bearing shell 4 located in the housing 1. The bearing shell 4 is made of an elastic material. The ball joint is closed with a rolled-in cap 5. A grease reservoir 6 is provided between the cap 5 and the ball head 3. The bearing shell 4 may be made of soft elastic plastic such as polyurethane, however, depending on the designated use, it may also be made of a hard elastic plastic such as polyoxymethylene.

In the embodiment of FIGS. 1 to 7, the bearing shell 4 is provided with ribs 8 and shorter bars 9, separated from each other by grooves 10 and evenly distributed over the whole shell surface 7.

Figure 2:
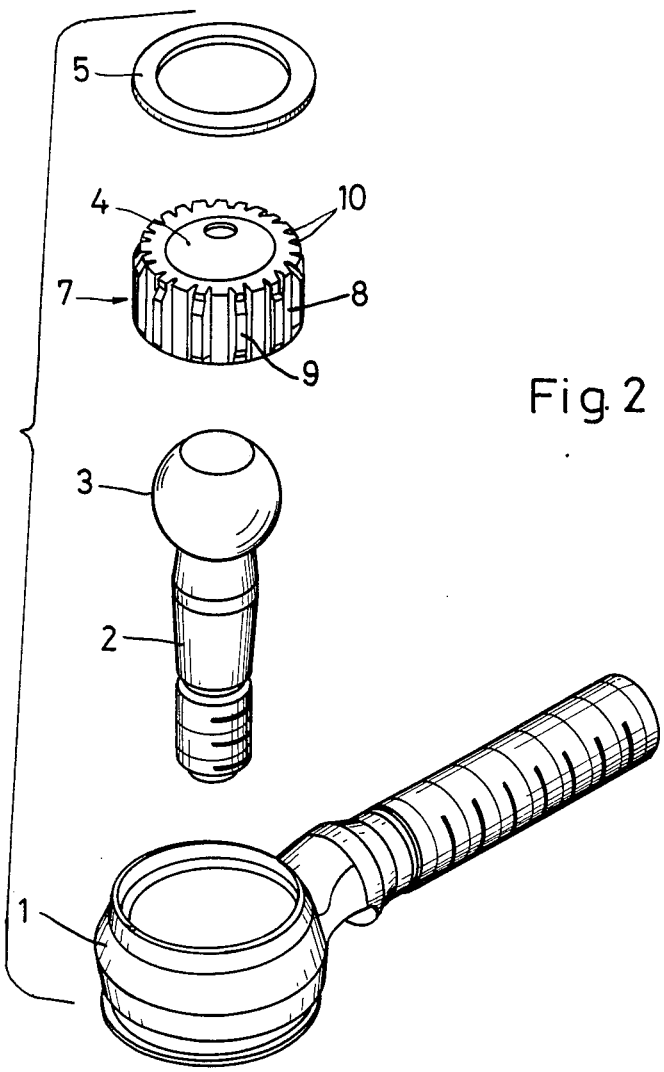
FIG. 2 shows the same ball joint in an exploded diagram.

When assembling the ball joint shown in the exploded view of FIG. 2, at first, only the longer ribs 8 come into contact with the joint housing 1, because, in the unprestressed condition, they have a diameter which is larger than the inner diameter by an amount "a" (FIG. 7) of the joint housing 1. When inserted into the joint housing 1, the long ribs 8 are deformed elastically and prestressed. At that time, the excess material of ribs 8 flows into the grooves 10. Only when strong impacts occur when driving which further deform the ribs 8 elastically, do the short bars 9 come into contact with the housing wall because they have, as compared with the inner diameter of the joint housing 1, a diameter which is smaller by an amount "b". In this way, when the longer ribs 8 have been already plastically deformed under action of spring forces acting thereon during driving, additional spring forces resulting from shock loads are absorbed by the greater surface of the short ribs 9. When the bearing shell 4 of the present invention is used, finishing by cutting of the inner diameter of the joint housing 1, which is usually forged, is no longer necessary.

In the embodiment of FIGS. 8 to 10, the ribs 8, bars 9 and grooves 10 are arranged on opposite sides of the equatorial plane 11 of the ball head 3. This eliminates different spring characteristics which may occur because of different angular positions between the joint housing 1 and the bearing shell 4 in the direction of the load when the joint is assembled.

In the embodiment of FIGS. 11 to 13, the ribs 8, bars 9 and grooves 10 are provided on only one half of the shell surface of the bearing shell 4. This provides the ball joint with a greater elasticity in the load direction, P, than in the opposite load direction, Q. Ball joints with such bearing shells 4 are preferably used in track rods to compensate different forces that cause the wheels to move sideways when negotiating curves.

In the embodiment of FIGS. 14 to 17, the ribs 8, bars 9, and grooves 10 are arranged only on diametrically opposite sections of the shell surface of the bearing shell 4, the circumferential extent of each section defining an angle of about 90°. Ball joints with such a bearing shell have a greater tilting moment in the direction of the axis x than in the direction of the axis y. Therefore, these ball joints are especially suitable as wheel joints.

What I claim is:

1. A ball joint comprising:
   a housing having a cavity,
   a bearing shell located in said cavity, and a ball stud having a head received in said bearing shell,
   said bearing shell being made of an elastic material and exerting a radial pressure on said ball head,
   said bearing shell having elastically deformable elevations arranged around the circumference of said bearing shell and extending radially between the inner surface of said housing and said bearing shell to exert said radial pressure on said ball head,
   said elevations including a plurality of axially extending ribs and bars alternately arranged around said circumference and separated by axially extending grooves in said bearing shell, the circumferential width of said bars being greater than the circumferential width of said ribs, and the radial extent of said ribs being greater than the radial extent of said bars, whereby said bars bear against the housing only in the case of comparatively large loads acting on the joint.

2. A ball joint as set forth in claim 1 wherein said ribs, bars and grooves are evenly arranged along the circumference of said bearing shell.

3. A ball joint as set forth in claim 1 or 2 wherein said ribs and bars are arranged in opposite halves with respect to the equatorial plane of said ball head.

4. A ball joint as set forth in claim 1 wherein said ribs and bars are arranged on only one half of said circumference of said bearing shell.

5. A ball joint as set forth in claim 1 wherein said ribs and bars are arranged on two opposite sections of said circumference of said bearing shell.

6. A ball joint comprising:
   a housing having a cavity,
   a ball stud having a ball head disposed in said cavity in said housing and a shank portion projecting from said housing,
   said cavity being defined by a surface curved around the axis of said ball stud,
   a bearing shell interposed between said ball head and said curved surface of said housing,
   first means for exerting radial preload pressure between said housing and said ball head upon comparatively low loads acting on said ball joint, said first means comprising a plurality of axially extending ribs formed on said bearing shell and which elastically engage said curved surface of said housing, and
   second means for exerting radial pressure between said housing and said ball head upon comparatively large loads acting on said ball joint, said second means comprising a plurality of axially extending bars formed on said bearing shell, said bars being spaced from said curved surface of said housing in the absence of comparatively large loads acting on said ball joint and engaging said curved surface of said housing upon comparatively large loads acting on said ball joint,
   said ribs and said bars being alternately arranged around the circumference of said bearing shell and being separated by axially extending grooves in said bearing shell.

7. A ball joint as set forth in claim 6 wherein the circumferential width of said bars is greater than the circumferential width of said ribs.

* * * * *